US011475748B2

(12) United States Patent
Stimek et al.

(10) Patent No.: US 11,475,748 B2
(45) Date of Patent: Oct. 18, 2022

(54) SYSTEM AND METHOD FOR RF TRIPWIRE BASED INTRUSION DETECTION

(71) Applicant: WilliamsRDM, Inc., Fort Worth, TX (US)

(72) Inventors: Christopher M. Stimek, Fort Worth, TX (US); Eduardo M. Hinojosa, Fort Worth, TX (US)

(73) Assignee: WilliamsRDM, Inc., Fort Worth, TX (US)

( * ) Notice: Subject to any disclaimer, the term of this patent is extended or adjusted under 35 U.S.C. 154(b) by 70 days.

(21) Appl. No.: 17/032,850

(22) Filed: Sep. 25, 2020

(65) Prior Publication Data
US 2021/0097835 A1   Apr. 1, 2021

Related U.S. Application Data

(60) Provisional application No. 62/906,704, filed on Sep. 26, 2019.

(51) Int. Cl.
G08B 13/24   (2006.01)
H04B 17/318   (2015.01)
G08B 25/10   (2006.01)

(52) U.S. Cl.
CPC ......... *G08B 13/2491* (2013.01); *G08B 25/10* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 2006/0128312 A1* | 6/2006 | Declerck | H04B 17/318 455/67.11 |
| 2007/0071026 A1* | 3/2007 | Rogers | H04N 21/6582 370/395.5 |
| 2009/0040952 A1* | 2/2009 | Cover | G01N 22/00 370/310 |
| 2012/0319844 A1* | 12/2012 | van Doorn | G01S 13/003 340/541 |
| 2018/0132285 A1* | 5/2018 | Jackson | H04W 76/10 |

* cited by examiner

*Primary Examiner* — Thomas S McCormack
(74) *Attorney, Agent, or Firm* — Foley & Lardner LLP

(57) ABSTRACT

Systems and methods for detecting a presence of a target such as a vehicle, an animal, a person, or another object in a monitored area without the use of sensors, are provided. Multiple RF field anomaly detection nodes may be spaced through the monitored area and connected, such as in a mesh network. The RF field anomaly detection nodes may include radio transceivers that communicate with one another and which monitor a signal strength of received signals. The nodes may compare the signal strengths to expected strength values. As a target enters a portion of the monitored area, the dielectric properties of the target cause at least one signal strength of at least one received signal to change. The RF field anomaly detection nodes may detect this change and trigger a further action or human readable alert corresponding to the presence of the target.

21 Claims, 8 Drawing Sheets

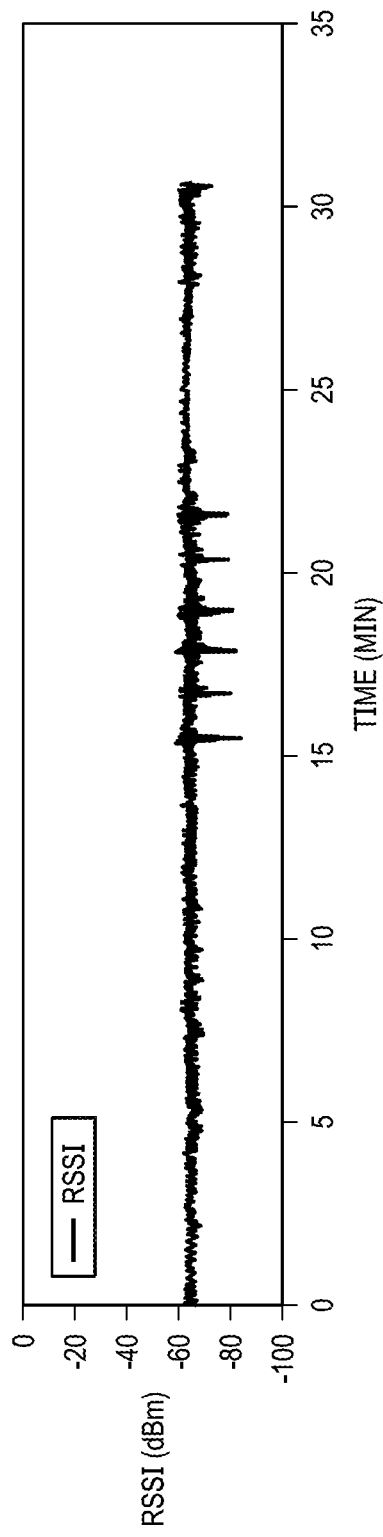
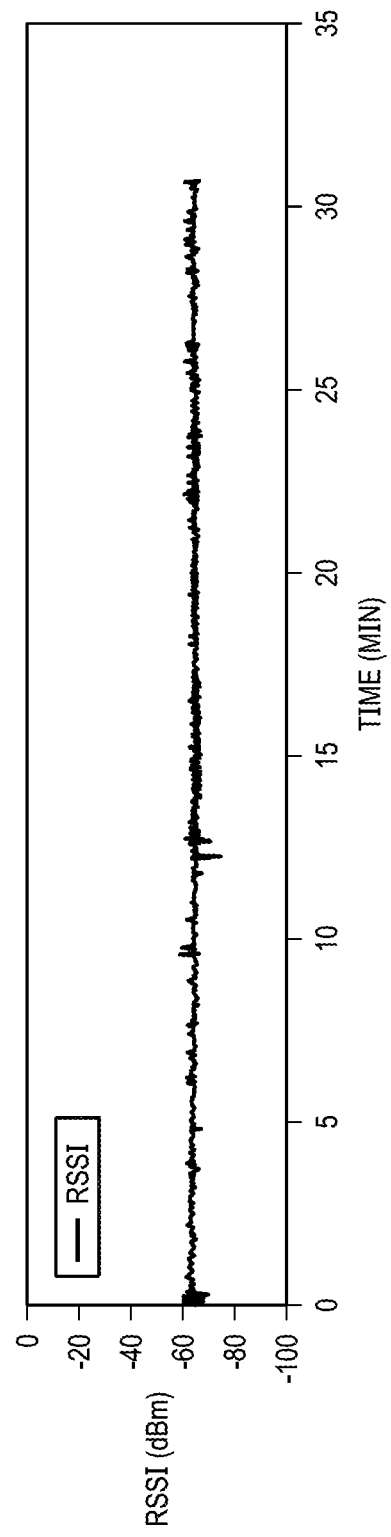

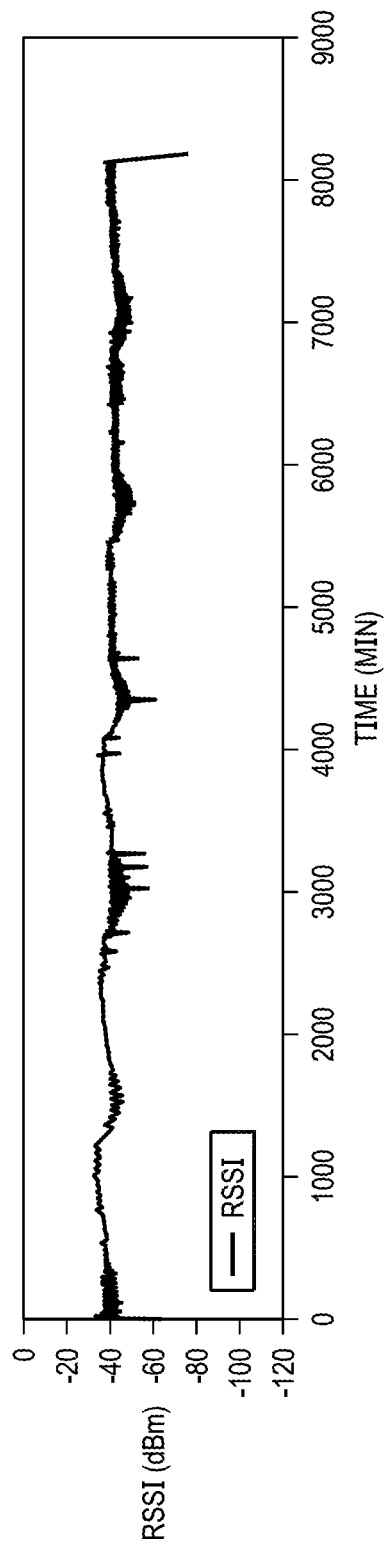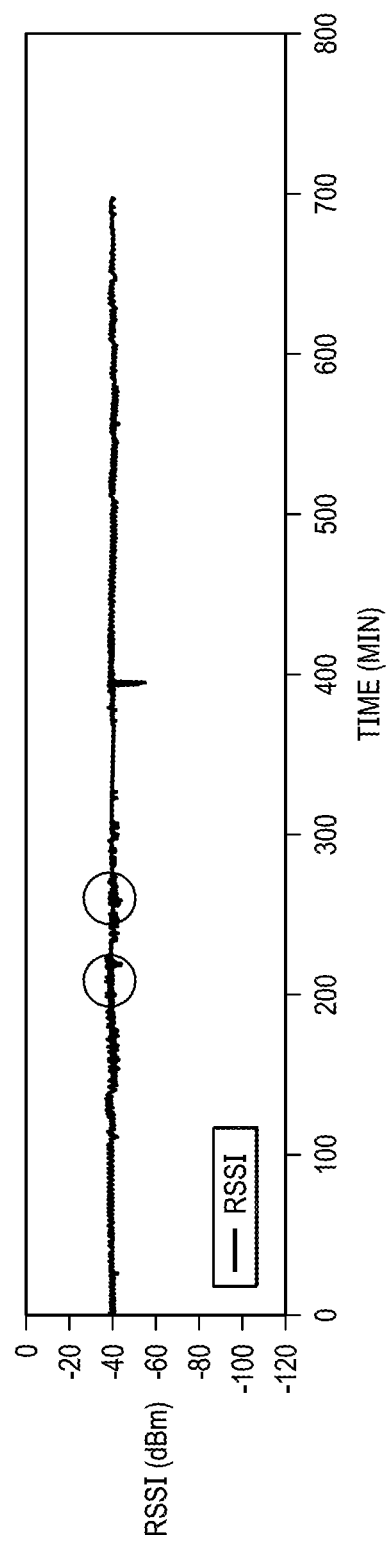

SYSTEM AND METHOD FOR RF TRIPWIRE BASED INTRUSION DETECTION

RELATED APPLICATIONS

This application claims the benefit of and priority from U.S. Provisional Patent Application Ser. No. 62/906,704 entitled "RF TRIPWIRE DETECTION", filed Sep. 26, 2019, and naming Christopher M. Stimek and Eduardo M. Hinojosa as inventors, the entirety of which is incorporated by reference herein for all purposes.

FIELD

The present disclosure relates to intrusion detection, and more particularly, intrusion detection based on RF tripwires.

BACKGROUND

Frequently, electronic detection of intrusions into an area is desired. Prior efforts directed to intrusion detection typically involve networks of sensors attached to radio transmitters. The sensor identifies a potential intrusion and the radio transmitter communicates related data among other system components. However, the deployment of sensors and radio hardware together requires the corresponding deployment of sufficient power sources to run both the sensors and the radios. Moreover, sensors typically have limited range and limited fields-of-view, necessitating the deployment of many sensors and associated radio hardware.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

An intrusion detection system is provided. The intrusion system may include multiple RF field anomaly detection nodes. For instance a first RF field anomaly detection node and a second RF field anomaly detection node may be provided. The first RF field anomaly detection node may have a transceiver receiving a first radio frequency signal including a first tripwire signal having a first received signal strength measured by the first RF field anomaly detection node. The second RF field anomaly detection node may include a transceiver transmitting the first radio frequency signal including the first tripwire signal. In various embodiments, the first RF field anomaly detection node and the second RF field anomaly detection node are spaced apart in a monitored area. A Fresnel zone may be disposed between the first RF field anomaly detection node and the second RF field anomaly detection node in the monitored area. A processor of the first RF field anomaly detection node may transmit a first detection event trigger data in response to the first received signal strength being outside of a first nominal quiescent strength range. The magnitude of the received signal strength may vary relative to the first nominal quiescent strength range in response to a presence of a target in the Fresnel zone.

The processor of the first RF field anomaly detection node may transmit the first detection event trigger in response to the first received signal strength being greater than the first nominal quiescent strength range. The processor of the first RF field anomaly detection node may transmit the first detection event trigger in response to the first received signal strength being less than the first nominal quiescent strength range. The first RF field anomaly detection node and the second RF field anomaly detection node may be in electronic data communication via the first tripwire signal, and the first RF field anomaly detection node may transmit the first detection event trigger data via the transceiver.

In various embodiments, there is also a third RF field anomaly detection node. The third RF field anomaly detection node may include a transceiver receiving the first radio frequency signal including the first tripwire signal transmitted by the second RF field anomaly detection node. The first tripwire signal may have a second received signal strength measured by the third RF field anomaly detection node. The first RF field anomaly detection node and the third RF field anomaly detection node may be in electronic communication. The third RF field anomaly detection node may transmit data representing the second received signal strength to the first RF field anomaly detection node. The processor of the first RF field anomaly detection node may transmit the first detection event trigger data further in response to the second received signal strength being outside of a second nominal quiescent strength range.

The system may also include a node-attached camera connected to the second RF field anomaly detection node and configured to capture an image of the monitored area in response to a transmitted first detection event trigger data received by the second RF field anomaly detection node from the first RF field anomaly detection node. Moreover, the system may include a cluster node configured to receive the first detection event trigger data from the first RF field anomaly detection node, and further configured to receive data representative of the captured image, and configured to transmit the first detection event trigger data and the captured image to a user's device for displaying on a map of the monitored area.

In various embodiments, neither the first RF field anomaly detection node, the second RF field anomaly detection node, nor the third RF field anomaly detection node includes a sensor. Moreover, in various embodiments the first RF field anomaly detection node and the second RF field anomaly detection nodes are both nodes of a mesh network having multiple RF field anomaly detection nodes physically emplaced along a geographic border.

An RF field anomaly detection node is provided. The node may include a radio receiver, a microcontroller, and a radio transmitter. The radio receiver may be configured to receive a first radio frequency signal, and measure a signal strength of the first radio frequency signal. The radio frequency signal may be transmitted by an adjacent RF field anomaly detection node. The microcontroller may be configured to interoperate with the radio transceiver and to compare a signal strength of the first radio frequency signal to a first nominal quiescent strength range. The radio transmitter may be configured to transmit data corresponding to a detection event of a target in response to the first radio frequency signal being measured by at least one of the microcontroller and the radio receiver to be outside the first nominal quiescent strength range.

In various embodiments, the radio transmitter is further configured to transmit a second radio frequency signal to a second adjacent RF field anomaly detection node for receipt and measurement. The node may also include a global positioning system (GPS) receiver connected to the microcontroller and configured to provide a time source for the radio transmitter to schedule transmissions. The GPS receiver may be configured to provide a source of location data. The radio transceiver of the RF field anomaly detection node includes both the radio receiver and the radio transmitter. The radio transmitter may be a 2.4 GHz transmitter. The 2.4 GHz transmitter implements an IEEE 801.15.4-compliant modulation schema.

In certain embodiments, the RF field anomaly detection node does not include a sensor configured to sense a presence of a target within a monitored area. Similarly, the RF field anomaly detection node does not include a sensor configured to sense a presence of a target within a monitored area, and the radio transceiver both (i) senses detection events in response to changes in measured signal strength of the first radio frequency signal and also (ii) transmits the data corresponding to the detection event to a cluster node.

The method may include monitoring, over a first duration of time, a RF signal strength environment including a plurality of signal strengths associated with a plurality of nodes to determine a nominal quiescent strength range for each signal strength. The method may include monitoring, over a second duration of time, the RF signal strength environment including the plurality of signal strengths associated with the plurality of nodes to measure an operating signal strength magnitude for each signal strength. The method may include comparing the measured operating signal strength magnitude to the nominal quiescent strength range for each signal strength and generating raw trigger data in response to the comparing, the raw trigger data corresponding to a determination of whether the measured operating signal strength magnitude is outside the nominal quiescent strength range. The method may include applying a filter to the raw trigger data to generate filtered trigger data, the filtered trigger data corresponding to a first detection event, the first detection event being that in response to the measured operating signal strength magnitude being outside the nominal quiescent strength range, a target is present in a monitored area. Finally, the method may include transmitting a first detection event trigger data in response to the filtered trigger data corresponding to the first detection event.

In various instances, the applying the filter further includes verifying that a further measured operating signal strength magnitude is also outside a further nominal quiescent strength range, the further measured operating strength magnitude being measured by a different node of the plurality of nodes. In further instances, the first duration of time is longer than the second duration of time.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIGS. 4A-E depict example signal strengths over time of a tripwire signal link received by a RF field anomaly detection node, in accordance with various embodiments;

DETAILED DESCRIPTION

Figure 1A:
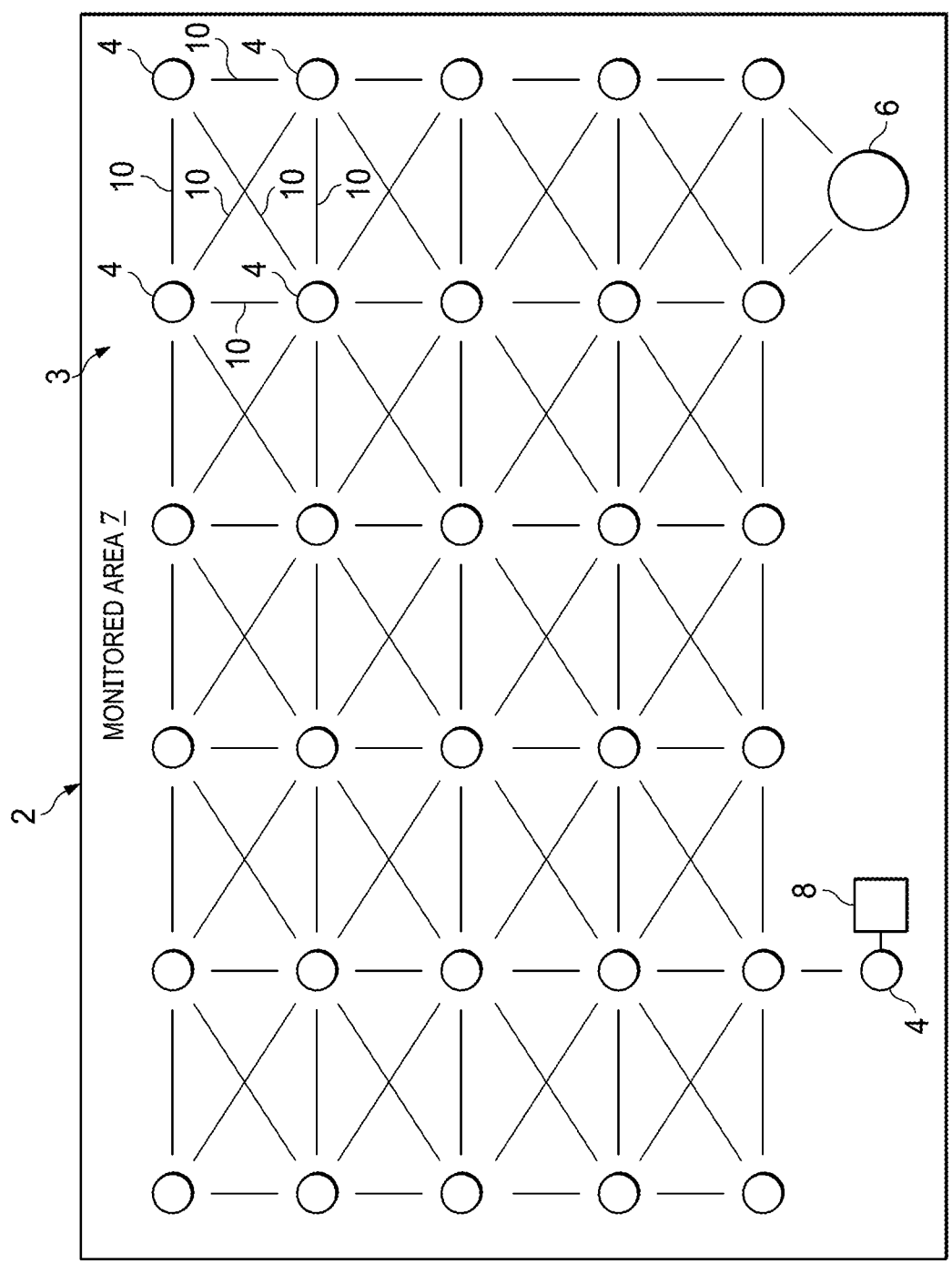
FIGS. 1A-B illustrate a monitored area with multiple RF field anomaly detection nodes and tripwire signal links.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Advances in technology have led to an increasingly networked world of electronic devices including sensors and effectors both sensing aspects of the surrounding environment ("context environment") and effecting aspects of the surrounding environment (also, "context environment"). One application of such networking technology includes intrusion detection. In various embodiments, different received signal strengths of one or more RF signal are monitored and measured throughout an area. These different received signal strengths may be collectively termed a RF signal strength environment. The RF signal strength environment is just one aspect of a context environment.

Typical applications for intrusion detection sensors include to detect the intrusion of people, animals, or vehicles into restricted areas. Different types of sensors are used. For instance, seismic, passive infrared (PIR), acoustic, magnetic, thermal imaging, radar, wind, humidity, and/or ultrasonic sensors are just a few of the types of sensors that are used in various types of sensor networks. In various covert sensor networks, any combination of the mentioned sensor types or different sensor types may be used. In various sensor networks, PIR or seismic sensors may be used.

Typically, a sensor will connect to a processor that samples the sensor to detect a sensed presence of a target, such as an animal, person, or vehicle (e.g., a "detection event"). Moreover, a transmitter, such as a wireless radio transmitter may be connected to the processor to communicate data representing the existence of the detection event to a monitoring station. In various embodiments, a network of multiple sensors may, through corresponding processors and transmitters, communicate to a monitoring station in a hub and spoke network architecture. In various embodiments, a network of multiple sensors may, through corresponding processors and transmitters, communicate with each other, and/or form a mesh network. Moreover, in various instances, a gateway device may connect the network to a monitoring station. Thus, many different network configurations may be contemplated, including hub-and-spoke, mesh, peer-to-peer, store-and-forward structures, and/or the like.

As disclosed herein, an intrusion detection system is provided which eliminates a need for traditional sensors, and instead, uses a wireless radio transceiver as the sensor to detect intrusion of a target and also as a communication medium to provide an associated alert to notify others of the intrusion. In this manner, cost is reduced, hardware requirements reduced, electrical power consumption minimized, and reliability of the system enhanced. For instance, a node may be fully sealed and enclosed, eliminating windows or other openings to allow traditional sensors to sense the context environment. Moreover, a need for an optical line of site between a sensor and a context environment is eliminated.

Thus, provided herein is an intrusion detection sensor network that comprises RF field anomaly detection nodes. The RF field anomaly detection nodes may have radio transceivers to trigger detection events by detecting changes in a strength of a received RF signal. For instance, one node may transmit a signal. Another node may receive the transmitted signal and measure a strength of the received signal. When a target enters a signal path between the two nodes or otherwise interacts with the electrical or magnetic fields associated with a radio transmission (for example, in a Fresnel zone), then a magnitude of the radio signal at a receiving node changes. For instance, targets may increase or decrease the strength of the received signal depending on their material properties. Targets may exhibit capacitive or inductive reactance, causing phase or polarization changes in the received signal which may also be measured and which may also effect the strength of the received signal. Other effects may similarly be measured and may correspond to different types of targets.

The RF field anomaly detection nodes may have no sensor, but may use the radio transceiver as the sensor and to communicate data. The RF field anomaly detection node may have no detection event detecting sensor, but may have other sensors, such as wind, humidity, and/or the like. The radio transceiver may transmit signals to other nodes containing data, such as data representing the existence of a detection event. This same signal may also be monitored by one or more of the nodes and measured to determine whether a detection event is ongoing. Nodes may transmit and receive signals containing other data as well, or may transmit and receive signals without meaningful content, but simply to provide a signal that can be measured for determination of whether a target is present in the near-field or far-field of the signal or in another position in the signal path or in an associated Fresnel zone.

The sensing nodes may have unique identifiers and may be emplaced in known locations. In this manner, the location of the target may be determined. In further embodiments, the sensing nodes may be emplaced in unknown locations, such as when emplaced in large numbers across a context environment, or when emplaced by dropping from the air or a vehicle. The sensing nodes emplaced in unknown locations may have location detecting aspects, such as a global positioning system (GPS) receiver, so that the sensing node may provide location data to the system, again facilitating location of the target.

The sensing nodes may trigger other devices. For example, the sensing nodes may be in electronic communication with cameras, alarms, access denial systems, and/or the like. The sensing nodes may, for example, wirelessly trigger a camera to collect an image of the context environment to facilitate further identification and analysis of a target. In further embodiments, the sensing node may be wired in operative communication with devices for triggering.

Figure 3:
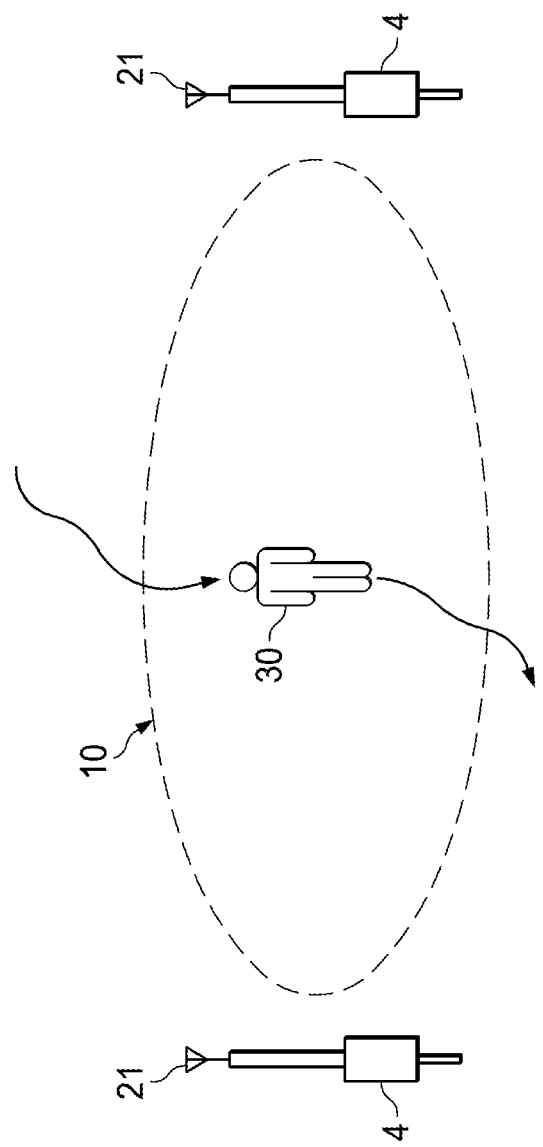
FIG. 3 illustrates two RF field anomaly detection nodes communicating via a tripwire signal link having an associated Fresnel zone, in accordance with various embodiments.

Turning now to FIGS. 1A and 3, an example embodiment of an intrusion detection system 2 is disclosed. An intrusion detection system 2 may comprise a plurality of RF field anomaly detection nodes 4. Thus, an intrusion detection system 2 may comprise a node array 3. The node array 3 may comprise the plurality of RF field anomaly detection nodes 4. The RF field anomaly detection nodes 4 may be arranged in a pattern. For example, a row of nodes may be emplaced near a border to detect when a target 30 passes between the nodes and thus crosses the border. Multiple rows of nodes may be emplaced near a border, such as to provide redundancy or facilitate collection of direction and/or speed data as a target moves through the rows over time. A grid of RF field anomaly detection nodes 4 may be emplaced. For instance, a grid of RF field anomaly detection nodes 4 may be emplaced to facilitate tracking of movement of a target 30 through an area as the target 30 moves between different RF field anomaly detection nodes 4, as well as calculation of target speed and direction.

The intrusion detection system 2 may comprise a cluster node 6. A cluster node 6 may comprise an electronic device in operative communication with the RF field anomaly detection nodes 4 of the node array 3 and may be configured to provide a communication gateway between the RF field anomaly detection nodes 4 of the node array 3 and other systems and methods. For example, a central control center may be in electronic communication with multiple cluster nodes 6. Each cluster node 6 may aggregate data from the RF field anomaly detection nodes 4 of a node array 3 and may transmit the aggregated data to the central control center. In this manner, the capabilities of the cluster node 6 to communicate to a central control center do not need to be built into the RF field anomaly detection nodes 4, facilitating lower cost, lower power consumption, and smaller size of the RF field anomaly detection nodes 4, which may be covertly emplaced. A cluster node 6 may provide a gateway between the node array 3 of the intrusion detection system 2 and the internet. Messages received by the cluster node 6 may be forwarded to a server to collect data and host a web based user interface. The web based user interface may also display images, such as those collected from a node-linked camera 8 discussed further below. The web based user interface may assemble data from the RF field anomaly detection nodes 4 corresponding to detection events, data corresponding to locations of the RF field anomaly detection nodes 4 that identified the detection events, and data corresponding to images from node-linked cameras 8 to facilitate review by a human operator on a displayed map of detection events and associated images.

The intrusion detection system 2 may comprise a node-linked camera 8. A node-linked camera 8 may comprise a camera deployed in or adjacent to a monitored area 7 and operatively coupled to a RF field anomaly detection node 4. The RF field anomaly detection node 4 may trigger the node-linked camera 8 in response to a detection event. Moreover, different RF field anomaly detection nodes 4 may also trigger the node-linked camera 8 via data communicated over tripwire signal link(s) 10 and/or other electronic connections.

Turning in greater detail to the node array 3 of the intrusion detection system 2, the node array 3 may comprise a plurality of RF field anomaly detection nodes 4 in radio frequency wireless communication with one or more other of the plurality of RF field anomaly detection nodes 4. For example, a node of the plurality of nodes may transmit a RF signal to another node of the plurality of nodes. In various embodiments, these pairs of nodes are immediately neighboring nodes. In further embodiments, these pairs of nodes are spaced apart with other nodes interstitially disposed between them. Moreover, while reference is made to pairs of nodes, in various embodiments, a node may transmit a RF signal to multiple other nodes of the plurality of nodes and/or may receive a RF signal from multiple other nodes of the plurality of nodes. The RF signal traversing a portion of physical space of the monitored area 7 may be called a "tripwire signal link 10." Thus, in various embodiments, the node array 3 comprises a plurality of RF field anomaly detection nodes 4 in radio frequency wireless communication via a plurality of tripwire signal links 10 comprising radio signals traveling through a physical space of a monitored area 7.

One or more RF field anomaly detection node 4 may measure a signal strength of a tripwire signal link 10 and determine the presence of a target (and thus existence of a detection event) based on received signal strength (e.g., a Received Signal Strength Indicator (RSSI)). In various embodiments a radio 20 of the RF field anomaly detection node 4 performs the measuring, and in further embodiments, a microcontroller 22 of the RF field anomaly detection node may perform the measuring. Importantly, the one or more RF field anomaly detection node 4 may measure a RSSI of a tripwire signal link 10 and compare the RSSI to a threshold, triggering a detection event based solely on the measure of the RSSI. Even more specifically, the one or more RF field anomaly detection node 4 may measure a RSSI of a tripwire signal link 10 and compare the RSSI to a threshold, triggering a detection event based solely on the measure of the RSSI and not based on a link quality metric associated with a modulated signal and/or data errors associated with content of a modulated signal and/or or any other aspect other than a RSSI. In some embodiments, an RF field anomaly detection node 4 may even detect a target and trigger a detection event without demodulating a content of the tripwire signal link 10 and without even the capability to demodulate the content of the tripwire signal link 10. Consequently, in further embodiments, an array of receivers may be disposed as RF field anomaly detection nodes 4 and may monitor a transmitted RF field associated with a separate transmitter, and detect variations in local field strength (e.g., RSSI) associated with the presence of a target and thus trigger detection events.

Figure 1B:
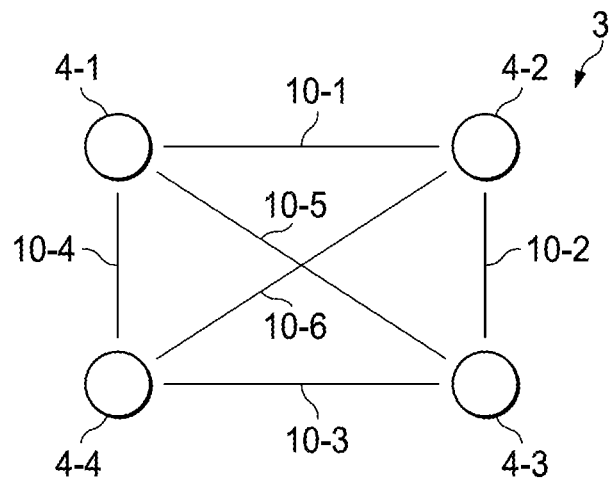

Turning now to FIGS. 1A, 1B, and 3, example embodiments of an intrusion detection system 2 are further illustrated. Notably, while the tripwire signal links 10 are shown as linear RF paths, one may appreciate that a practical system may comprise signals more accurately represented by radiation lobes originating from an antenna, rather than discrete lines. In various embodiments, while the phrasing "tripwire signal link" is used herein, one may appreciate that the signal being represented as a line is associated with a Fresnel zone, rather than a line, such that targets within the Fresnel zone of the tripwire signal link 10 trigger a detection event.

A first RF field anomaly detection node 4-1 may transmit a first tripwire signal link 10-1. While a second RF field anomaly detection node 4-2 is shown in radio communication with the first RF field anomaly detection node 4-1 via the first tripwire signal link 10-1, one may appreciate that also the third RF field anomaly detection node 4-3 and/or the fourth RF field anomaly detection node 4-4 may also receive the signal associated with the first tripwire signal link 10-1. Thus, the plurality of RF field anomaly detection node 4 and tripwire signal links 10 may exhibit paired relationships where a first RF field anomaly detection node 4-1 transmits a signal (first tripwire signal link 10-1) and a second RF field anomaly detection node 4-2 receives the signal (first tripwire signal link 10-1) and measures the strength of the signal.

However, the plurality of RF nodes and tripwire signal links 10 may exhibit different relationships where multiple nodes (first RF field anomaly detection node 4-1, second RF field anomaly detection node 4-2, third RF field anomaly detection node 4-3, and/or fourth RF field anomaly detection node 4-4) measure the strength of multiple tripwire signal links (first tripwire signal link 10-1, second tripwire signal link 10-2, third tripwire signal link 10-3, fourth tripwire signal link 10-4, fifth tripwire signal link 10-5, and/or sixth tripwire signal link 10-6). Thus, the tripwire signal links 10 may be conceptualized as a cloud of signals, as radiation lobes, and/or as a RF power density environment, rather than discrete wires that may be tripped by an intruder. Different RF emissions within the monitored area 7 may exhibit different signal strengths throughout the monitored area 7, such as according to the inverse square law. Unexpected or rapid increases or decreases in this signal strength may indicate a presence of a target 30 in the monitored area 7. Thus, while tripwire signal links are discussed with wire-related terminology, the signal links may be a continuous variable strength analog electrical and/or magnetic field occupying a region.

FIG. 1B shows a simultaneous depiction of the first RF field anomaly detection node 4-1, second RF field anomaly detection node 4-2, third RF field anomaly detection node 4-3, and fourth RF field anomaly detection node 4-4 with the first tripwire signal link 10-1, second tripwire signal link 10-2, third tripwire signal link 10-3, fourth tripwire signal link 10-4, fifth tripwire signal link 10-5, and/or sixth tripwire signal link 10-6. However, one may appreciate that the different nodes transmit and receive the different tripwire signal links at different times, so as to facilitate non-interfering transmission and reception. For example, different timeslots may be associated with the various nodes and/or the various signal links. In various instances, the timeslots are determined randomly to ameliorate interfering transmission and/or reception.

Figure 2:
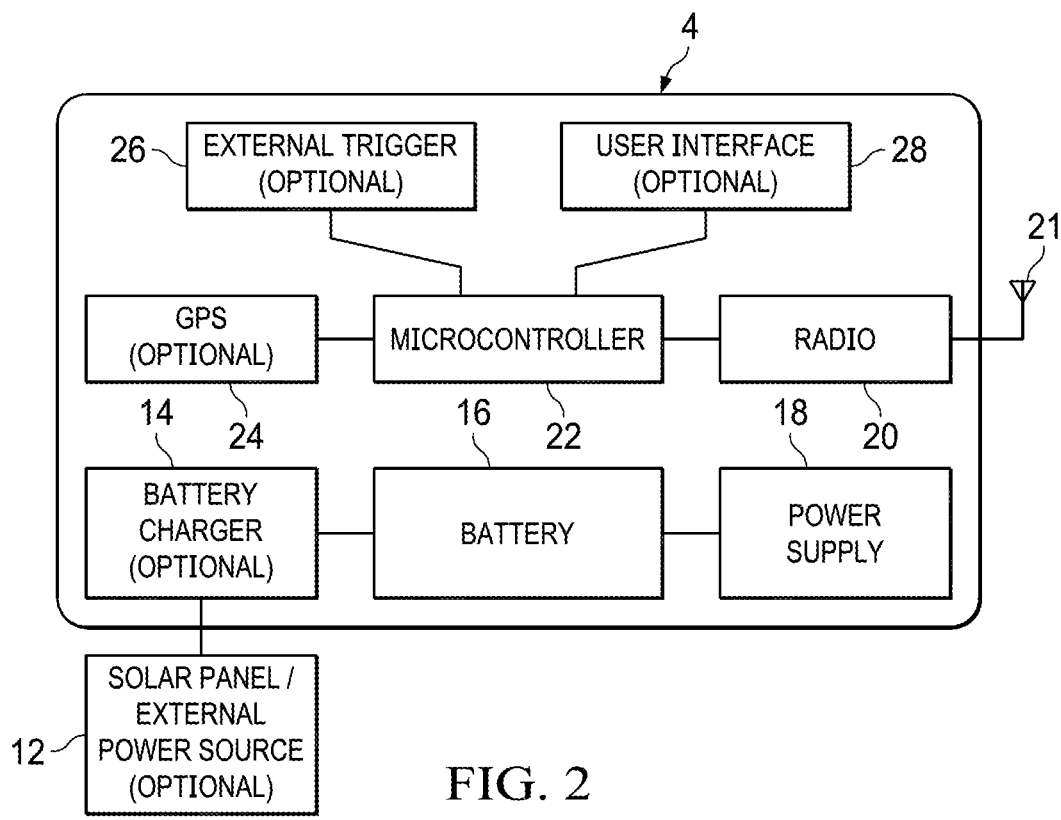
FIG. 2 illustrates an example RF field anomaly detection node, in accordance with various embodiments.

Turning to FIG. 2, with occasional reference to aspects of FIGS. 1A-B and 3, attention is now directed to one embodiment of a RF field anomaly detection node 4 for emplacement in an intrusion detection system 2 (FIGS. 1A, 1B, 3). In various embodiments, a RF field anomaly detection node 4 may comprise a radio 20. A radio 20 may comprise a transceiver. Moreover, in further embodiments, some RF field anomaly detection nodes 4 perform a transmitting function such that the radio 20 may comprise a transmitter and some RF field anomaly detection nodes 4 perform a receiving function, such that a radio 20 may comprise a receiver.

In various embodiments, radio 20 comprises a 2.4 GHz transceiver. In further embodiments, the radio 20 comprises a 5 GHz transceiver. In yet further embodiments, the radio 20 comprises a 10 GHz transceiver. One may appreciate that radios 20 operating at higher RF frequencies generate tripwire signal links 10 capable of detecting a presence of smaller objects, however, radios 20 operating at higher RF frequencies generate tripwire signal links 10 more susceptible to attenuation by leaves and debris falling on the RF field anomaly detection node 4, attenuation associated with ambient humidity along the path of the tripwire signal link 10, and the like. In yet further embodiments, radio 20 comprises a 315 MHz transceiver, or a 433 MHz transceiver, or a 800 MHz transceiver, or a 900 MHz transceiver, or any transceiver as desired.

In various embodiments, radio 20 comprises a modulated transceiver. For example, RF field anomaly detection nodes 4 may communicate data across the tripwire signal link 10. This data may include data representative of whether a detection event has occurred or is occurring, data regarding a health of a RF field anomaly detection node 4, or other unrelated data, such as regarding other devices. Thus, the communication medium among the RF field anomaly detection nodes 4 may also be the sensor of the RF field anomaly detection nodes 4. Stated yet another way, the sensor of the nodes (e.g., the radio 20 detecting a change in RF signal strength corresponding to a detection event as a target 30 enters or moves about the monitored area 7) is also the effector of the nodes (e.g., the radio 20 transmitting data corresponding to the existence of the detection event within the monitored area 7).

Various modulation protocols may be implemented. For example, on-off keying (OOK), frequency shift keying (FSK), minimum shift keying (MSK), Gaussian frequency shift keying (GFSK), and other protocols may be contemplated. In various embodiments, radio 20 comprises a transceiver operating according to an IEEE 802.15.4 protocol. For instance, a radio 20 operating according to an IEEE 802.15.4 protocol may provide for significant data transmission across the tripwire signal link 10. For example, 250 kbps data rates may be contemplated.

Radio 20 may operate according to a protocol incorporating time synchronization. For example, a RF field anomaly detection node 4 may include a GPS receiver, the GPS receiver providing an accurate time source whereby a radio 20 may communicate in a timeslot referenced to the accurate time source. In this manner, power consumption of a system 2 containing many RF field anomaly detection nodes 4 may be reduced in connection with the elimination of various handshaking or retransmission messages and the assignment of different time slots for radios 20 of different RF field anomaly detection nodes 4.

Moreover, radio 20, in connection with being modulated to generate the tripwire signal link 10, may operate intermittently. For instance, a transmission rate of messages modulating a signal, the amplitude of which is being measured, may be varied. A fast transmission rate may facilitate the detection of targets that appear very briefly in the tripwire signal link 10, whereas a slow transmission rate may fail to detect targets that appear very briefly because the target may pass through the physical space associated with the tripwire signal link 10 between transmissions, but may facilitate reduced power consumption. In various embodiments, the radio 20 being modulated to generate the tripwire signal link 10, transmits between 2 and 10 messages per second via the tripwire signal link 10. A receiving RF field anomaly detection node 4 may measure the amplitude of the tripwire signal link 10 in connection with each messages and compare the amplitude to various filters or baseline values to determine whether a target is present in the monitored area 7.

The RF field anomaly detection node 4 may also include an antenna 21. In various embodiments, antenna 21 is enclosed within a single enclosure with the other components of the RF field anomaly detection node 4. In this manner, environmental resiliency of the RF field anomaly detection node 4 may be enhanced and convert emplacement facilitated. In various embodiments, antenna 21 is external and extends out of the RF field anomaly detection node 4. In further embodiments, antenna 21 is separate from the enclosure of the RF field anomaly detection node 4 and is connected to other aspects of RF field anomaly detection node 4 by a cable.

Antenna 21 may comprise a directional antenna. For example, antenna 21 may direct one or more primary lobe of radiated RF energy in one or more direction, thereby generating one or more tripwire signal links 10. In further instances, antenna 21 may be omnidirectional, directing a single lobe (e.g., an oblate spheroid) of radiated RF energy in all directions about an axis, generating one or more tripwire signal links 10. In yet further instances, antenna 21 may be approximately isotropic, or any other configuration as desired.

Antenna 21 may have a polarization. One may appreciate that a polarization mismatch between a transmitting and receiving antenna may contribute to an attenuation of a signal passing between the transmitting and receiving antenna. In various embodiments, a polarization of antenna 21 may be selected to correspond to the same polarization as antennas 21 of other RF field anomaly detection nodes 4. Alternatively, a polarization of antenna 21 may be selected to be different than the polarization of antennas 21 of other RF field anomaly detection nodes 4. Moreover, depending on the composition of an RF noise environment in a monitored area 7, in various embodiments, polarization of antenna 21 may be selected to provide isolation from ambient RF noise or other signal sources within in reception range of RF field anomaly detection node 4. An antenna 21 may have multiple elements, facilitating changing of polarization such as in response to changing context environments. For instance, in a context environment with significant vertically polarized noise at an operating frequency of the RF field anomaly detection nodes 4, the RF field anomaly detection nodes 4 utilizing multiple element antennas may select antenna elements so that antenna 21 is a horizontally polarized antenna 21.

Antenna 21 may be emplaced separately from and connected to RF field anomaly detection node 4, such as to dispose antenna 21 at a desired height. In various embodiments, antenna 21 is disposed two to three feet above terrain such as to minimize deleterious effects of high grass and other debris which may cause changes in the strength of the tripwire signal link 10 or potentially trigger false alarms or impede communication so that targets 30 in the monitored area 7 fail to generate detection events.

The RF field anomaly detection node 4 may include a microcontroller 22. The microcontroller 22 may comprise a processor and a non-transient computer readable memory. The microcontroller 22 may comprise a low power processor.

The RF field anomaly detection node 4 may include a location detector 24. The location detector 24 may be configured to determine a physical location of the RF field anomaly detection node 4. In various embodiments, the location detector 24 comprises a global positioning system (GPS) receiver. In further instances, the location detector 24 may comprise an RF direction finding device, or may comprise a memory device with a preset location stored thereon, or may comprise a logical aspect of the microcontroller 22 with a location stored thereon, or may comprise an inertial measuring unit, a celestial navigation device, or any other location detecting device. In various embodiments, the location detector 24 comprises an aspect of a user interface 28, wherein a user manually enters data representative of the location that the RF field anomaly detection node 4 is emplaced.

The RF field anomaly detection node 4 may comprise an external power source 12. The external power source 12 may comprise any source of electrical power. For example, the external power source 12 may comprise a solar panel. In further embodiments, the external power source 12 may comprise an fuel cell, a thermoelectric power generation device, a hydroelectric power generation device, and/or any other electrical power source. The external power source 12 may be traditional mains power connections to the electrical distribution grid.

The RF field anomaly detection node 4 may comprise an internal power source charger 14. An internal power source charger 14 may be a charging circuit configured to provide electricity at a selected voltage and/or current in order to charge an internal power source 16 with electricity from the external power source 12.

The RF field anomaly detection node 4 may comprise an internal power source 16. The internal power source 16 may comprise a battery. The internal power source 16 may comprise a capacitor. In various embodiments, the internal power source 16 comprises a battery such as a nickel cadmium (NiCad) battery, a nickel metal hydride (NiMH) battery, a lithium ion polymer (LiPO) battery, a lead acid battery, an alkaline battery, or any battery or combination of batteries.

The RF field anomaly detection node 4 may include a power supply 18. The power supply 18 may receive electrical power from the internal power source 16 and may output electrical power with appropriate voltage, current, waveform, etc. to power the components of the RF field anomaly detection node 4.

The RF field anomaly detection node 4 may include an external trigger connection 26. For example, the RF field anomaly detection node 4 may trigger other devices in response to a detection event. For instance, the RF field anomaly detection node 4 may trigger a node-linked camera 8 attached to the external trigger connection 26 to collect an image. In various embodiments, the external trigger connection 26 comprises a data output. In further embodiments, the external trigger connection 26 comprises an output line that changes state in response to a detection event. For example, an external trigger connection 26 could transition states between a high or low voltage or a high-impedance state.

The external trigger connection 26 may further comprise a logical connection among different RF field anomaly detection nodes 4 communicating via a tripwire signal link 10. For instance, a first RF field anomaly detection node 4-1 may be communicating with a second RF field anomaly detection node 4-2 across a first tripwire signal link 10-1 when a target disrupts the first tripwire signal link 10-1, causing the amplitude of the first tripwire signal link 10-1 to drop. In response, the first RF field anomaly detection node 4-1 may transmit a message to a third RF field anomaly detection node 4-3 by the first tripwire signal link 10-1 or by a different tripwire signal link 10, such as a second tripwire signal link 10-2, directing the third RF field anomaly detection node 4-3 to trigger a node-linked camera 8. In this manner, the external trigger connection 26 of an RF field anomaly detection node 4 may be remotely triggered by other RF field anomaly detection nodes 4, and may also be a logical communication link between nodes, rather than an actual direct connection between a node and external device.

The RF field anomaly detection node 4 may comprise a user interface 28. A user interface 28 may comprise any human readable audio, visual, or tactile, or other communication device. For example, a single pushbutton and one or more LED could be provided. The single pushbutton may allow the RF field anomaly detection node 4 to be turned on or off or allow the user to instruct the microcontroller 22 to make one or more LED display status information. Moreover, a user interface 28 may permit a user to enter location data into the RF field anomaly detection node 4 that corresponds to a location that the RF field anomaly detection node 4 is emplaced. In further embodiments, the user interface 28 comprises an electronic browser session running in the microcontroller 22 and accessed with a different electronic device. In further embodiments, the user interface 28 comprises a different RF wireless connection between a user's device and the RF field anomaly detection node 4.

Attention is now directed to FIGS. 4A-4E (in addition to occasional reference to elements depicted in FIGS. 1A-3) for discussion of various different detection events associated with various different targets which may affect the RSSI of a tripwire signal link 10.

Figure 4A:
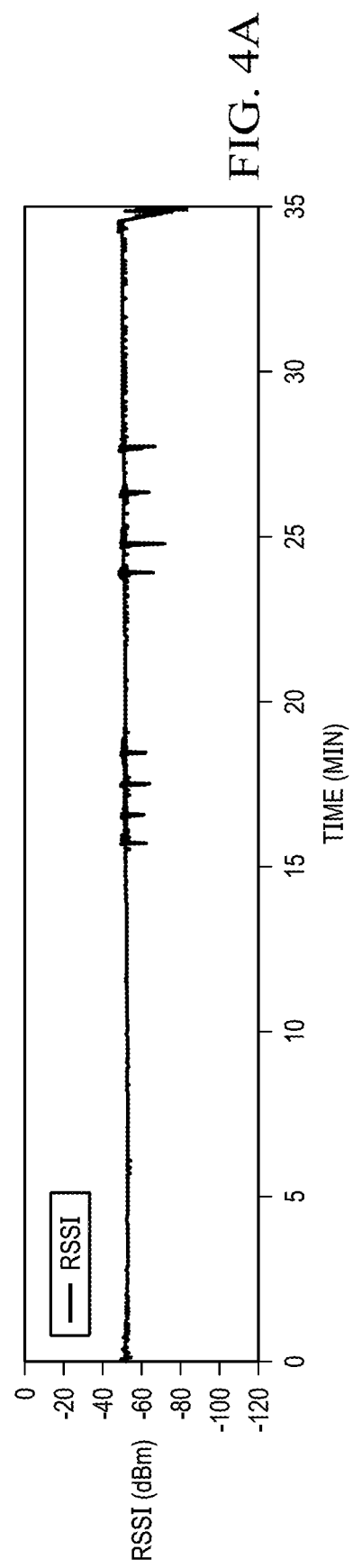

With reference to FIG. 4A (as well as FIGS. 1A-3) a RF field anomaly detection node 4 may measure an RSSI of a tripwire signal link 10 with a quiescent value at, for example, −50 dBm. At 15 minutes elapsed time, a group of two people walk between a first RF field anomaly detection node 4-1 which is receiving a first tripwire signal link 10-1 transmitted by a second RF field anomaly detection node 4-2. The group of two people pass between the first RF field anomaly detection node 4-1 and the second RF field anomaly detection node 4-2 through the Fresnel zone of the first tripwire signal link 10-1 four times. Correspondingly, four abrupt 15-20 dBm decreases in RSSI of the first tripwire signal link 10-1, as measured by the first RF field anomaly detection node 4-1 occur in response to each passage of the group through the Fresnel zone. At approximately 23 minutes elapsed time, a group of five people travel along the same path. Correspondingly, a sequence of 20-25 dBm decreases in RSSI of the first tripwire signal link 10-1, as measured by the first RF field anomaly detection node 4-1 occur in response to each passage of the group through the Fresnel zone. Thus one may appreciate that a microcontroller 22 may not only determine the existence of a target in connection with a detection event, but may also categorize the target based on comparison to known RSSI signatures for different types and numbers of targets.

Referring now to FIG. 4B (as well as FIGS. 1A-3), a group of seven people pass between the first RF field anomaly detection node 4-1 and the second RF field anomaly detection node 4-2 through the Fresnel zone of the first tripwire signal link 10-1, six times. Despite the evident greater background noise reflected in the greater variability of the quiescent RSSI of the first tripwire signal link 10-1, the passage of the targets through the Fresnel zone is readily detectable.

In various instances, a target may cause a brief increase in RSSI of the first tripwire signal link 10-1, rather than a decrease. For instance, FIG. 4C corresponds to a measured RSSI of a first tripwire signal link 10-1 transmitted by a second RF field anomaly detection node 4-2 and received by a first RF field anomaly detection node 4-1. As a target transits near the Fresnel zone of the first tripwire signal link 10-1 at approximately 8 minutes, the RSSI briefly increases approximately 10 dBm. This target is a ferromagnetic pickup truck, the dielectric properties of which momentarily increase the amplitude of the tripwire signal link 10-1. In this instance, rather than passing between the nodes associated with the first tripwire signal link 10-1, the RF-reflective pickup truck passed near the nodes, causing energy associated with the tripwire signal link 10-1 to be reflected back toward the nodes, increasing the measured RSSI. Subsequently at approximately 12 minutes elapsed time, momentary decreases in RSSI are represented in connection with the detection of a target comprising humans, again, walking through the Fresnel zone. Consequently, the microcontroller 22 may further categorize targets into types based on dielectric properties, for instance, whether they reflect/conduct RF energy, as would certain metal vehicles, or whether they absorb RF energy, as would a living being.

With reference to FIG. 4D, and ongoing reference to FIGS. 1A-3, a long test of approximately 9000 minutes is reflected. Periodic changes in RSSI and in ambient RF noise are illustrated. In various embodiments, methods are provided for recalibration over time to account for changing RF noise environments. Various brief, significant decreases in RSSI of approximately 20 dBm are depicted, again corresponding to a passage of targets through a Fresnel zone of the first tripwire signal link 10-1.

FIG. 4E depicts characteristics that are measurable to categorize a target according to travel speed. In various instances, a target may cause a brief decrease in RSSI of the first tripwire signal link 10-1 that is reflected over a wider duration of time. For instance, a first RF field anomaly detection node 4-1 measures a RSSI of a first tripwire signal link 10-1 transmitted by a second RF field anomaly detection node 4-2. The RSSI diminishes approximately 5 dBm for several minutes in connection with a passage of a wild animal through the Fresnel zone, whereas a measured RSSI of a first tripwire signal link 10-1 transmitted by a second RF field anomaly detection node 4-2 diminishes approximately 10-15 dBm in connection with the passage of a fast moving vehicle. For clarity, circles are depicted on FIG. 4E about the changing RSSI corresponding to the passage of a wild animal. Notably, and in contrast to the passage of the pickup previously discussed, the fast moving vehicle is an all-terrain vehicle which is smaller, with a human rider being externally exposed on top of the vehicle rather within a faraday cage-like enclosure of a pickup truck passenger compartment. As expected, this vehicle/rider pair absorbs RF energy.

FIG. 4E also depicts characteristics that are measurable to categorize a target according to travel speed. In various instances, a target may cause a brief decrease in RSSI of the first tripwire signal link 10-1 that is over a wider duration of time for a slow moving target and a shorter duration of time for a fast moving target. For instance, a measured RSSI of a first tripwire signal link 10-1 transmitted by a second RF field anomaly detection node 4-2 and measured by a first RF field anomaly detection node 4-1 diminishes for several minutes in connection with a passage of a wild animal through the Fresnel zone. In contrast, the measured RSSI diminishes much more briefly in connection with passage of a fast moving vehicle.

Figure 5:
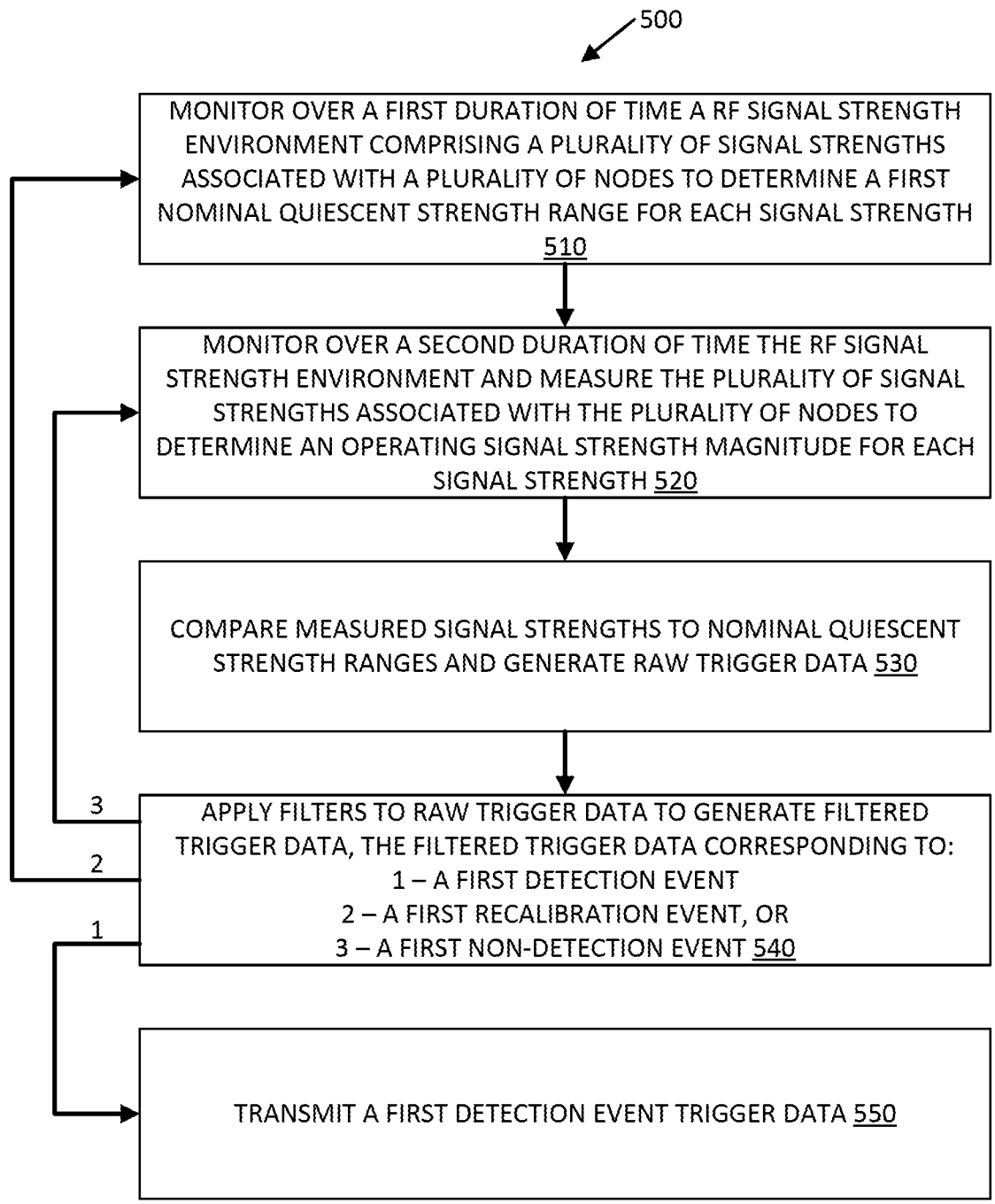
FIG. 5 depicts a method of RF field anomaly detection, in accordance with various embodiments.

Maintaining reference to FIGS. 1A-3 but turning specifically to FIG. 5, a method of RF field anomaly detection 500 is disclosed. In various embodiments, a system comprising a plurality of RF field anomaly detection nodes 4 may monitor, over a first duration of time, an RF signal strength environment. For instance, a RF field anomaly detection node 4 may receive a tripwire signal link 10 and measure the amplitude of the received signal. Multiple RF field anomaly detection nodes 4 may similarly receive multiple tripwire signal links 10 and measure multiple amplitudes of the received signals. Over a period of time, nominal signal strengths may be ascribed to each received signal. The range of nominal signal strength for a received signal is called the nominal quiescent strength range. In this manner, an calibration operation may be performed in block 510. More specifically, the RF field anomaly detection node 4 establishes a baseline RSSI value for a received tripwire signal link 10, so that the RF field anomaly detection node 4 can later determine whether a measured RSSI value is outside the range associated with no targets being in the Fresnel zone of the tripwire signal link 10 (e.g., outside the nominal quiescent strength range).

If later, the RF field anomaly detection node 4 determines whether a measured RSSI value is outside the range associated with no targets being in the Fresnel zone of the tripwire signal link 10, then a target is present in the Fresnel zone. On the other hand, the RF field anomaly detection node 4 can also later determine whether a measured RSSI is inside the range associated with no targets being in the Fresnel zone of the tripwire signal link 10 (e.g., inside the nominal quiescent strength range.

The calibration operation may be performed by multiple RF field anomaly nodes 4 operating in an intrusion detection system 2. However, the following example is, for brevity, provided for a calibration operation by a single RF field anomaly node of the plurality of nodes. With continuing reference to block 510 of FIG. 5, a first RF field anomaly detection node 4-1 may monitor, over a first duration of time, an first RF signal strength of a first tripwire signal link 10-1 that is transmitted by a second RF field anomaly detection node 4-2 to determine a first nominal quiescent strength range for the first RF signal strength. In various embodiments, a single tripwire signal link 10 is monitored by a RF field anomaly detection node 4, whereas in further embodiments, multiple tripwire signal links 10 are monitored by a RF field anomaly detection node 4.

Over time, the calibration operation of block 510 may be re-performed, as the dielectric properties of the context environment evolve with wind, vegetation growth, humidity, etc. Thus, a system comprising a plurality of RF field anomaly detection nodes 4 may monitor, over a first duration of time, an RF signal strength environment comprising a plurality of signal strengths associated with a plurality of nodes to determine a first nominal quiescent strength range for each signal strength.

Subsequently to the performance of block 510, the intrusion detection system 2 may perform a further monitoring action. Generally, after calibration of the first nominal quiescent strength range for a signal strength of a tripwire signal link 10, subsequent measurements of the tripwire signal link 10 can be evaluated to indicate whether a target 30 is present and a detection event should be triggered. Thus, a RF field anomaly detection node 4 may monitor over a second duration of time, a measured RSSI of a tripwire signal link 10 received by the RF field anomaly detection node 4. Thus, a system 2 comprising a plurality of RF field anomaly detection nodes 4 may monitor, over a second duration of time, the RF signal strength environment comprising a plurality of signal strengths associated with a plurality of nodes to determine an operating signal strength magnitude of each signal strength (block 520).

In various embodiments, the second duration of time (e.g, the duration associated with block 520) is shorter than the first duration of time (e.g., the duration associated with block 510). For instance, system 2 when undergoing calibration may be concerned primarily with longer-term, or more slowly developing changes in an RF signal strength environment as vegetation, humidity, etc. change. However, system 2 when operating to identify a detection event associated with a target may monitor the RF signal strength environment over a shorter duration of time. For instance, the tripwire signal link 10 may comprise data bursts, such that the duty cycle of monitoring is less than 100%, but rather corresponds at least partially to the data bursts. Moreover, the monitoring may comprise periodic sampling and measurement, the rate of which can be adjusted based on desire to balance power consumption with reliability of detection of targets. Consequently, the second duration of time may be shorter, as sampling need not continue for as long to identify a target moving through the array 3 of nodes 4 in the system 2, as it would need to continue for in order to identify slow developing changes associated with growing vegetation.

Moreover, a node 4 may save data representing a signal strength associated with samples that were determined to be measurements of signal strength when no target was present, and collect this data over time, using this data for calibration. Thus, while block 510 is depicted separately from block 520, in various instances, the intrusion detection system 2 may perform blocks 510 and block 520 in overlapping time, adjusting calibration (block 510) based on data collected during performance of block 520 when such data is determined to be associated with the absence of a target from the monitored area 7.

The system 2 may perform a further comparison action. After measuring the operating signal strength magnitude in block 520 and the nominal quiescent strength range in block 510, the node 4 of the system 2 may compare measured signal strength(s) of tripwire signal link(s) 10 to nominal quiescent strength range(s) of the same tripwire signal link(s) 10 and generate raw trigger data (block 530).

Raw trigger data may comprise a magnitude and/or sign of a differencing operation between a measured signal strength (operating signal strength magnitude) and a nominal quiescent strength range. Moreover, raw trigger data may comprise multiple comparisons of multiple samples of measured signal strengths to the nominal quiescent strength range.

The raw trigger data may comprise other aspects the samples, in addition to a magnitude and/or sign of a differencing operation. For instance, the raw trigger data may include time-domain information, such as time stamps associated with samples, and the results of probabilistic or stochastic analyses on sets of samples. In one example, the raw trigger data may include time domain data such as whether a signal strength is slowly drifting, or if aspects of RF noise have changed, such as might evidence a need for recalibration.

Stated more specifically, a microprocessor 22 of a RF field anomaly detection node 4 may compare a measured signal strength of a first tripwire signal link 10 to a nominal quiescent strength range for the first tripwire signal link 10 and generate a first raw trigger data (block 530).

The system 2 may perform a filtering action. For example, a RF field anomaly detection node 4 may apply filter to raw trigger data to generate filtered trigger data. In further embodiments, the RF field anomaly detection node 4 transmits the raw trigger data to a cluster node 6 or server or other device for processing and generation of filtered data (block 540).

The filtered trigger data may correspond to (1) a first detection event, (2) a first recalibration event, or (3) a first non-detection event. For example, the raw trigger data may comprise an indication that a measured signal strength of a tripwire signal link 10 exceeds the nominal quiescent strength range for that tripwire signal link 10. Thus, a filter may be applied to the raw trigger data to generate filtered trigger data corresponding to a first detection event and the method proceeds to block 550 discussed further below.

For further example, the raw trigger data may comprise an indication that a measured signal strength of a tripwire signal link 10 changes slowly over time. Thus, a filter may be applied to the raw trigger data to generate filtered trigger data corresponding to a first recalibration event, and the method returns to block 510 and the RF field anomaly detection node 4 performs recalibration.

Finally, the raw trigger data may comprise an indication that a measured signal strength of a tripwire signal link 10 does not exceed the nominal quiescent strength range for that tripwire signal link 10. Thus, a filter may be applied to the raw trigger data to generate filtered trigger data corresponding to a first non-detection event. The method returns to block 520 and the RF field anomaly detection node 4 continues monitoring the tripwire signal link 10 to attempt detection of further targets in the monitored area 7.

In response to the filtered trigger data corresponding to (1) a first detection event, the method proceeds to block 550, and the system may perform a transmitting action. For example, in response to the filtered trigger data corresponding to a first detection event, the system may transmit a first detection event trigger data corresponding to a user-readable indication that a target 30 is detected (block 550). A RF field anomaly detection node 4 may transmit with its radio 20 data representative of the existence of a detection event. In further examples, a cluster node 6 may transmit data representative of the existence of a detection event to a network, for further transmission and delivery to a user's device.

Figure 6:
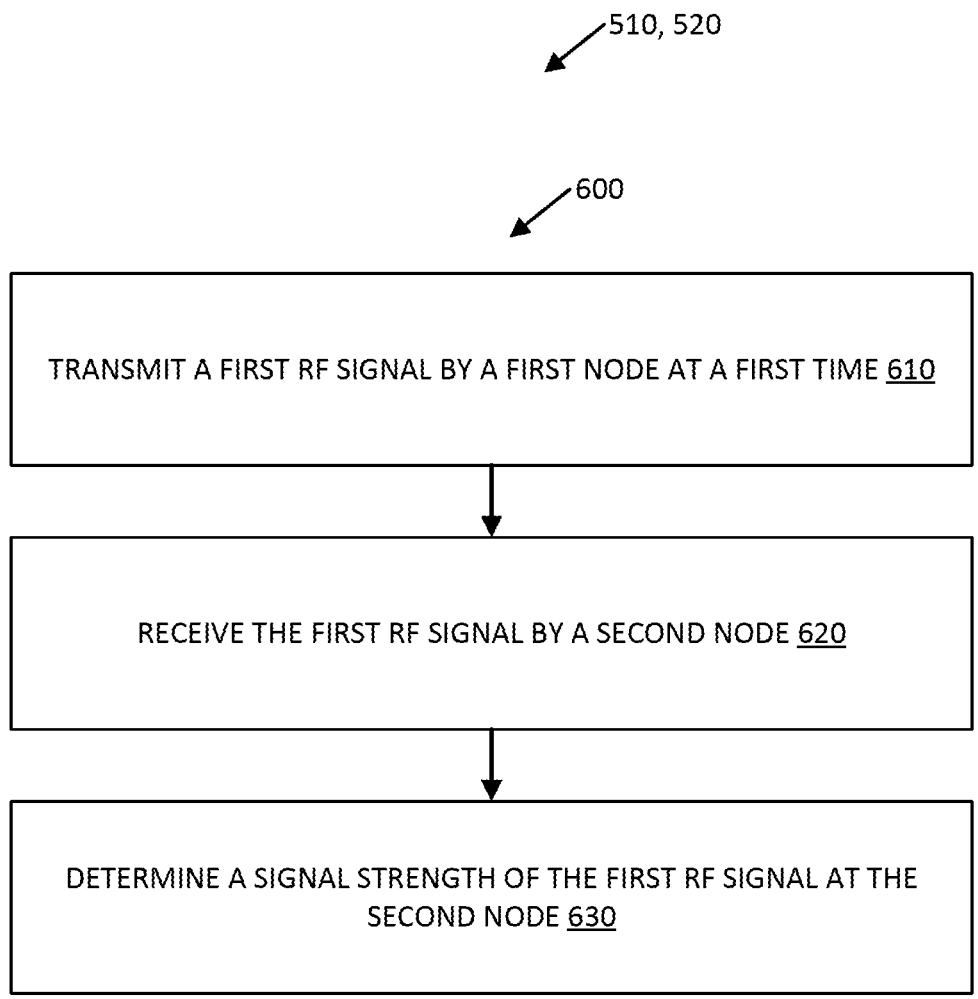
FIG. 6 depicts a node-pair interchange method of a method of RF field anomaly detection, in accordance with various embodiments.

Turning now in more detail to blocks 510 and blocks 520 above, attention is further directed to FIG. 6 which depicts a node-pair interchange method 600 that may be performed as an aspect of measuring a signal strength of a tripwire signal link 10 when calibrating one or more RF field anomaly detection node 4, and that may be performed as an aspect of measuring a signal strength of a tripwire signal link 10 when determining the operating signal strength magnitude during efforts to detect targets 30 in a monitored area 7. The node-pair interchange method 600 comprises a method implemented by a first RF field anomaly detection node 4-1 and a second RF field anomaly detection node 4-2 during blocks 510 and 520. Because blocks 510 and 520 refer to "monitoring" steps across an entire system 2, additional focus on the corresponding actions undertaken at a level of a pair of nodes is helpful. For example, block 510 provides to monitor over a first duration of time a RF signal strength environment comprising a plurality of signal strengths associated with a plurality of nodes to determine a first nominal quiescent strength range for each signal strength. Block 520 provides to monitor over a second duration of time, the RF signal strength environment and measure the plurality of signal strengths associated with the plurality of nodes to determine an operating signal strength magnitude for each signal strength. At the level of a single RF field anomaly detection node 4, each of these blocks correspond to transmitting a first RF signal (e.g., first tripwire signal link 10-1) by a first node (e.g., first RF field anomaly detection node 4-1) at a first time (block 610), receiving the first RF signal (e.g., first tripwire signal link 10-1) by a second node (e.g., second RF field anomaly detection node 4-2) (block 620), then determining a signal strength of the first RF signal (e.g., first tripwire signal link 10-1) at the second node (e.g., second RF field anomaly detection node 4-2) (block 630).

Figure 7:
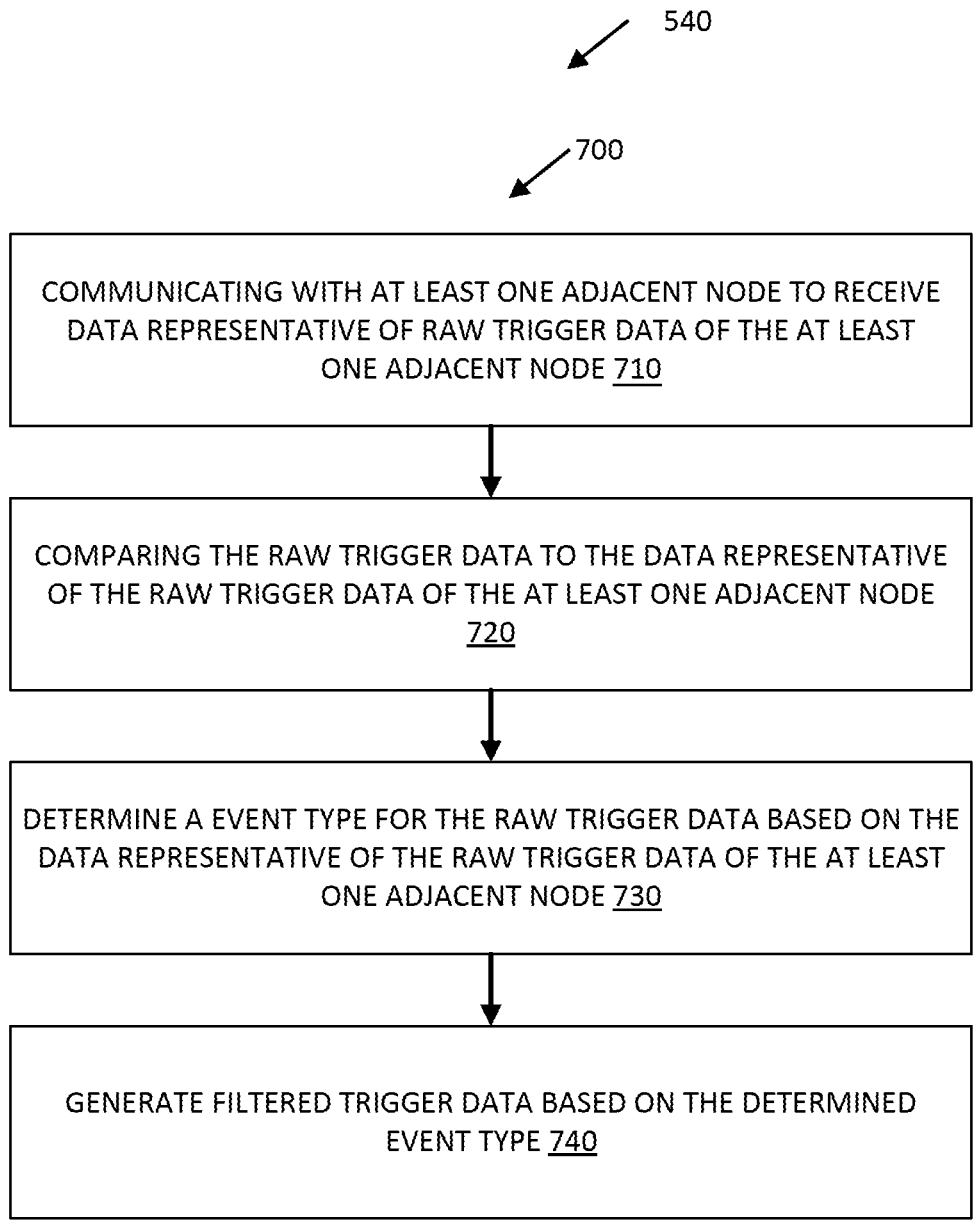
FIG. 7 depicts a method of false detection filtering of the method of RF field anomaly detection, in accordance with various embodiments.

Turning primary attention to FIGS. 5 and 7 (and with ongoing attention to elements in FIGS. 1A-3), FIG. 7 provides for a method of false detection filtering 700. While many different filters may be applied to raw trigger data to generate filtered trigger data in block 540, in various instances, a RF field anomaly detection node 4 utilizes additional the raw trigger data of other RF field anomaly detection nodes 4 to ameliorate false positive or false negative detection events.

Specifically, false positive detection events may be undesired. However, from time to time any individual RF field anomaly detection node 4 may exhibit momentary changes in measured RSSI that would possibly trigger a detection event despite no target 30 being present. Consequently, a method of false detection filtering 700 may be implemented. The method may comprise communicating by a first RF field anomaly detection node 4-1 with at least one adjacent node, such as a second RF field anomaly detection node 4-2, to receive data representative of raw trigger data of the at least one adjacent node (second RF field anomaly detection node 4-2) (block 710). The first RF field anomaly detection node 4-1 may compare the raw trigger data to the data representative of the raw trigger data of the at least one adjacent node, such as the second RF field anomaly detection node 4-2 (block 720). The first RF field anomaly detection node 4-1 may determine an event type (e.g., a first detection event, a first recalibration event, a first non-detection event) for the raw trigger data based on the data representative of the raw trigger data of the at least one adjacent node, such as the first RF field anomaly detection node 4-2 (block 730). For instance, a raw trigger data from a first RF field anomaly detection node 4-1 may correspond to a first detection event, however the raw trigger data from the second RF field anomaly detection node 4-2 may not correspond to a first detection event. In various embodiments, the disagreement among nodes of an existence of a detection event may indicate that the first RF field anomaly detection node 4-1 has erroneously detected a detection event. Thus, the method may include generating filtered trigger data based on the determined event type (block 740). For instance, in response to the event type being determined to be a first non-detection event because the first RF field anomaly detection node detected a false positive detection, the filtered trigger data may be generated corresponding to a first non-detection event. In contrast, if the raw data of both of the nodes both indicate a first detection event, then the event type may be determined to be a true detection and thus accurately, a first detection event. Thus, the filtered trigger data may be set to correspond to a first detection event. In various instances, a first detection event may be identified in response to multiple nodes indicating a detection event within a window of time, for instance, five seconds, or ten seconds, or any duration as desired. Moreover, in various instances, any number of nodes may be required to indicate such a detection event in order for a first detection event to be identified as valid. For instance, two nodes, or three nodes, or any number of nodes.

As used herein "controller" or "processor" mean any device capable of receiving and/or processing an electronic message, such as a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or the like.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk.

All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An intrusion detection system comprising:
   a first RF field anomaly detection node comprising a transceiver configured to receive a first radio frequency signal comprising a first tripwire signal having a first received signal strength measured by the first RF field anomaly detection node;
   a second RF field anomaly detection node comprising a transceiver configured to transmit the first radio frequency signal;
   a third RF field anomaly detection node comprising a transceiver configured to receive the first radio frequency signal transmitted by the second RF field anomaly detection node;
   wherein the first tripwire signal has a second received signal strength measured by the third RF field anomaly detection node;
   wherein the first RF field anomaly detection node; the second RF field anomaly detection node, and the third RF field anomaly detection node are spaced apart in a monitored area;
   wherein a Fresnel zone is disposed between the first RF field anomaly detection node and the second RF field anomaly detection node in the monitored area;
   wherein a processor of the first RF field anomaly detection node is configured to transmit a first detection event trigger data in response to the first received signal strength being outside of a first nominal quiescent strength range and the second received signal strength being outside of a second nominal quiescent strength range;
   wherein the first RF field anomaly detection node and the third RF field anomaly detection node are configured to be in electronic communication;
   wherein the third RF field anomaly detection node is configured to transmit data representing the second received signal strength to the first RF field anomaly detection node; and
   wherein a magnitude of the first received signal strength varies relative to the first nominal quiescent strength range in response to a presence of a target in the Fresnel zone.

2. The intrusion detection system of claim 1, wherein the processor of the first RF field anomaly detection node transmits the first detection event trigger data in response to the first received signal strength being greater than the first nominal quiescent strength range.

3. The intrusion detection system of claim 1, wherein the processor of the first RF field anomaly detection node transmits the first detection event trigger data in response to the first received signal strength being less than the first nominal quiescent strength range.

4. The intrusion detection system of claim 1, wherein the first RF field anomaly detection node and the second RF field anomaly detection node are in electronic data communication via the first tripwire signal, and where the first RF field anomaly detection node transmits the first detection event trigger data via the transceiver.

5. The intrusion detection system of claim 1, further comprising a node-attached camera connected to the second RF field anomaly detection node and configured to capture an image of the monitored area in response to a transmitted first detection event trigger data received by the second RF field anomaly detection node from the first RF field anomaly detection node.

6. The intrusion detection system of claim 5, further comprising a cluster node configured to receive the first detection event trigger data from the first RF field anomaly detection node, and further configured to receive data representative of the captured image, and configured to transmit the first detection event trigger data and the captured image to a user's device for displaying on a map of the monitored area.

7. The intrusion detection system of claim 1, wherein neither the first RF field anomaly detection node, the second RF field anomaly detection node, nor the third RF field anomaly detection node includes a sensor configured to detect the presence of the target.

8. The intrusion detection system of claim 1, wherein the first RF field anomaly detection node and the second RF field anomaly detection node are both nodes of a mesh network comprising multiple RF field anomaly detection nodes physically emplaced along a geographic border.

9. An RF field anomaly detection system comprising:
   an RF field anomaly detection node having a radio receiver configured to receive a first radio frequency signal, and measure a signal strength of the first radio frequency signal,
   wherein the first radio frequency signal is transmitted by an adjacent RF field anomaly detection node, the RF field anomaly detection node and the adjacent RF field anomaly detection node defining a monitored area;
   a microcontroller configured to interoperate with the radio receiver and to compare the signal strength of the first radio frequency signal to a first nominal quiescent strength range;
   a radio transmitter configured to transmit data corresponding to a detection event of a target in response to the first radio frequency signal being measured by at least one of the microcontroller and the radio receiver to be outside the first nominal quiescent strength range; and
   a camera connected to the adjacent RF anomaly detection node configured to capture an image of the monitored area in response to the transmitted date corresponding to the detection event.

10. The RF field anomaly detection node of claim 9, wherein the radio transmitter is further configured to transmit a second radio frequency signal to a second adjacent RF field anomaly detection node for receipt and measurement.

11. The RF field anomaly detection node of claim 10, further comprising a global positioning system (GPS)

receiver connected to the microcontroller and configured to provide a time source for the radio transmitter to schedule transmissions.

12. The RF field anomaly detection node of claim 9, further comprising a radio transceiver of the RF field anomaly detection node that includes both the radio receiver and the radio transmitter.

13. The RF field anomaly detection node of claim 12, wherein the RF field anomaly detection node does not include a sensor configured to sense a presence of the target within a monitored area.

14. The RF field anomaly detection node of claim 12, wherein the RF field anomaly detection node does not include a sensor configured to sense a presence of the target within a monitored area, and wherein the radio transceiver both (i) senses detection events in response to changes in the signal strength of the first radio frequency signal and also (ii) transmits the data corresponding to the detection event to a cluster node.

15. The RF field anomaly detection node of claim 9, wherein the radio transmitter is a 2.4 GHz transmitter.

16. The RF field anomaly detection node of claim 15, wherein the 2.4 GHz transmitter implements an IEEE 801.15.4-compliant modulation schema.

17. A method of RF field anomaly detection comprising:
monitoring, over a first duration of time, a RF signal strength environment comprising a plurality of signal strengths associated with a plurality of nodes to determine a nominal quiescent strength range for each signal strength;
monitoring, over a second duration of time, the RF signal strength environment comprising the plurality of signal strengths associated with the plurality of nodes to measure an operating signal strength magnitude for the each signal strength;
comparing the measured operating signal strength magnitude to the nominal quiescent strength range for the each signal strength and generating raw trigger data in response to the comparing, the raw trigger data corresponding to a determination of whether the measured operating signal strength magnitude is outside the nominal quiescent strength range;
applying a filter to the raw trigger data to generate filtered trigger data, the filtered trigger data corresponding to a first detection event, the first detection event being that in response to the measured operating signal strength magnitude being outside the nominal quiescent strength range, a target is present in a monitored area;
verifying that a second measured operating signal strength magnitude is outside a second nominal quiescent strength range, the second measured operating strength magnitude being measured by a different node of the plurality of nodes; and
transmitting a first detection event trigger data in response to the filtered trigger data corresponding to the first detection event.

18. The method of claim 17, wherein the first duration of time is longer than the second duration of time.

19. The intrusion detection system of claim 1, wherein the processor is further configured to identify a false positive detection event.

20. The RF field anomaly detection node of claim 9, wherein the radio transmitter is further configured to identify a false positive detection event and not transmit the data if the false detection event is identified.

21. The method of claim 17, wherein transmitting the first detection event trigger data does not occur if either of the first measured operating signal strength magnitude is not outside the first nominal quiescent strength range or the second measured operating signal strength magnitude is not outside the second nominal quiescent strength range.

* * * * *